US006414314B1

(12) United States Patent
Ikeda

(10) Patent No.: US 6,414,314 B1
(45) Date of Patent: Jul. 2, 2002

(54) PASSIVE-TYPE INFRARED DETECTOR WITH ELONGATED DETECTION AREAS

(75) Inventor: Hiroyuki Ikeda, Otsu (JP)

(73) Assignee: Optex Co., Ltd., Shiga (JP)

( * ) Notice: Subject to any disclaimer, the term of this patent is extended or adjusted under 35 U.S.C. 154(b) by 0 days.

(21) Appl. No.: 09/491,583

(22) Filed: Jan. 25, 2000

(30) Foreign Application Priority Data

Jan. 26, 1999 (JP) .......................................... 11-016700

(51) Int. Cl.[7] .................................................. G01J 5/08

(52) U.S. Cl. .................. 250/353; 250/336.1; 250/338.1

(58) Field of Search ............................. 250/353, 338.1, 250/336.1

(56) References Cited

U.S. PATENT DOCUMENTS

| | | | | |
|---|---|---|---|---|
| 4,644,147 A | | 2/1987 | Züblin | |
| 4,709,151 A | | 11/1987 | Guscott et al. | |
| 5,308,985 A | * | 5/1994 | Lee | 250/353 |
| 6,087,938 A | * | 7/2000 | Gitelis et al. | 250/353 |

FOREIGN PATENT DOCUMENTS

| | | |
|---|---|---|
| EP | 323621 | 7/1989 |
| GB | 2047886 | 12/1980 |
| GB | 2080945 | 2/1982 |

* cited by examiner

*Primary Examiner*—Hung Xuan Dang
(74) *Attorney, Agent, or Firm*—Price and Gess

(57) ABSTRACT

A passive-type infrared detector 1 includes an infrared sensor 3, a pair of lens elements (optical elements) 4R and 4L, a pair of mirrors 5R and 5L and a casing 2. The lens elements 4R and 4L are used to define detection areas a+ and a− opposed substantially 180° to each other for the infrared sensor 3. The mirrors 5R and 5L are used to direct infrared rays of light from the detection areas towards the infrared sensor 3. When this passive-type infrared detector 1 is installed at a position intermediate of an alert region, a combination of the infrared sensor 3, one of the lens elements 4R and one of the mirrors 5R is effective to monitor a range from one end of the alert region to the intermediate position whereas a combination of the infrared sensor 3, the other of the lens elements 4L and the other of the mirrors 5L is effective to monitor a range from the opposite end of the alert region to the intermediate position. Therefore, one half of the alert region may be a detection distance. Consequently, the lens elements 4R and 4L can have a reduced focal length, allowing the passive-type infrared detector 1 of a reduced outer size to monitor the long alert region.

12 Claims, 8 Drawing Sheets

PASSIVE-TYPE INFRARED DETECTOR WITH ELONGATED DETECTION AREAS

BACKGROUND OF THE INVENTION

1. Field of the Invention

The present invention relates to a passive-type infrared detector for detecting a trespasser by receiving infrared rays of light emitted from the trespasser entering an alert region.

2. Description of the Prior Art

This type of the passive-type infrared detector includes an optical element for collecting infrared rays of light emitted from a human body and an infrared sensor for receiving the collected infrared rays of light. The angle of coverage of the infrared detector when viewed from top, that is, the detection area on a horizontal plane is generally divided and defined into a plurality of pairs each pair including plus (+) and minus (−) areas. Also, this type of the infrared detector is installed at one extremity of the alert region so that the detection area can traverse from one end of the alert region to be watched towards the other extremity thereof. Electric wiring connection to the infrared detector is carried out by passing electric wires, which extend in a loft or behind the ceiling of a building to a location near the infrared detector, down to behind a wall surface on which the infrared detector is mounted and finally connecting them to the infrared detector.

The infrared detector is available in two types; a wide sensor generally used for detecting a trespasser in a relatively large space such as the interior of a room, and a narrow sensor generally used for detecting a trespasser entering the window or the door facing a narrow pathway. In the case of the wide sensor, considering the purpose for which it is used, the detection area of the detector is provided by a plural number of the pairs (5 to 9 pairs) including the plus and minus areas. The pair is hereinafter referred to as a finger of the detection area. In contrast thereto, in the case of the narrow sensor, the finger of the detection area is defined in a small number, for example, 1 to 2 pairs.

In addition, considering the purpose for which the narrow sensor is used, the distance of detection over which the narrow sensor can monitor is so defined as to be longer than, for example, 1.5 to 2 or more times the distance of detection over which the wide sensor can monitor. As discussed above, in order to expand the detection distance of the narrow sensor to a value longer than that of the wide sensor, the following measures have hitherto been taken.

One of the measures is such as to increase the focal length of a lens element of the narrow sensor to a value sufficient to make the width of an object to be detected and the width of the detection area (or the plus or minus area) equal to each other at the maximum distance (hereinafter referred to as the rated distance) from the position of the detector, where the detector can detect the object to be detected (the trespasser), to the object to be detected. FIGS. 5A to 5F illustrate the detector (narrow sensor) 21 embodying this measure in a plan view, a front elevational view, a left-hand side view, a right-hand side view, a cross-sectional view taken along the line IV—IV in FIG. 5D, and a cross-sectional view taken along the line V—V in FIG. 5B whereas FIGS. 6A and 6B illustrate the detection area of the detector 21 in a top plan view and a front elevational view.

Another one of the measures is such that the focal length of the lens of the narrow sensor remains the same as that in the wide sensor, and that since as compared with the wide sensor the number of the fingers of the detection areas is small in the case of the narrow sensor, the surface area of the lens element (a kind of an optical element) for each of the detection area is correspondingly increased to allow the amount of light received to be increased to thereby increase the rated distance. FIGS. 7A to 7F illustrate the detector (narrow sensor) 31 embodying this measure in a plan view, a front elevational view, a left-hand side view, a right-hand side view, a cross-sectional view taken along the line VI—VI in FIG. 7D, and a cross-sectional view taken along the line VII—VII in FIG. 7B whereas FIGS. 8A and 8B illustrate the detection area of the detector 31 in a top plan view and a front elevational view. It is to be noted that the above described two measures are generally employed in combination.

However, to increase the detection distance of the detector (narrow sensor) 21 according to the measure shown in FIG. 5 results in increase of the focal length of the lens element 24, which in turn results in increase of the distance between an infrared sensor 23 and the lens element 24 within a casing 22 of the detector 21 accompanied by an increase of the outer size of the detector 21. Consequently, when the detector 21 is installed in a building or the like, the detector 21 will be so noticeable that a trespasser will get alerted to the presence of the detector 21. This brings about reduction not only in an security, but also in aesthetic feature of the building.

Where the detection distance of the detector (narrow sensor) 31 is increased according to the measure shown in FIG. 7, the distance between the infrared sensor 31 and the lens element 34 corresponding to the focal length within the casing 32 of the detector 31 can be reduced and the outer size of the detector 31 can also be reduced. However, considering that the width of the detection area is proportional to the ratio between the rated distance and the focal length (as will be discussed in detail later), the width of the detection area increases to a value greater than an optimum value for the object to be detected at the rated distance. Consequently, if the trespasser moves slowly, difficulty will occur in detecting the trespasser. Although it is possible to detect the trespasser moving slowly if the circuit is properly designed, a different problem will occur in such case in that erroneous detection will tend to occur under the influence of external disturbances such as wind and/or change in temperature at a low frequency.

In the case of the narrow sensor, as hereinbefore discussed, it is generally used for the purpose of detecting an entry through a window or door facing a narrow pathway or to watch the perimeter of the building and, therefore, care must be taken at the time of installation that a human body within an area unnecessary to be detected is not detected. In view of this, the width of the detection area is desirably as small as possible and any increase of the width of the detection area which occurs under the previously described measure is undesirable.

In addition, with the prior art narrow sensor, as hereinbefore discussed, the narrow sensor is installed at an extremity of an elongated area such as the inner or outer perimeter of a building which is an alert region and electric wiring connection to the detector is carried out by passing electric wires, which extend in a loft or behind the ceiling of a building to a location near the detector, down to behind a wall surface on which the infrared detector is mounted and finally connecting them to the detector. Accordingly, the electric wiring job is performed in the loft or behind the ceiling of the building. Considering, however, that the roof is generally of a shape downwardly inclined towards a corner, the space available for the electric wiring job is narrow at the corner which may be the extremity of the alert region and, therefore, difficulty tends to be encountered in accomplishing the electric wiring job.

SUMMARY OF THE INVENTION

In view of the foregoing, the present invention has been devised to substantially eliminate the above discussed problems and is intended to provide a compact passive-type infrared detector of a type having an increased detection distance and capable of being easily installed.

To this end, one aspect of the present invention provides a passive-type infrared detector which includes an infrared sensor, a pair of optical elements for defining detection areas opposed substantially 180° to each other for the infrared sensor, and a pair of mirrors for directing infrared rays of light from the detection areas towards the infrared sensor. The optical elements referred to above may be, for example, a lens element.

With the passive-type infrared detector of the structure described above, when the infrared detector is installed at an intermediate position of the alert region, the use of a combination of the infrared sensor, one of the optical elements and one of the mirrors is effective to monitor an area ranging from one end of the alert region to the intermediate position whereas the use of a combination of the same infrared sensor, the other of the optical elements and the other of the mirrors is effective to monitor an area ranging from the opposite end of the alert region to the intermediate position. Accordingly, a distance of ½ of the alert region can be utilized as a detection distance. Consequently, for watching the same alert region, the optical elements can have a focal length that is ½ of that used in the prior art detector which is positioned at one extremity of the alert region and, hence, with the detector of a reduced outer size, a relatively long alert region can be monitored. Also, since the detector is installed at the intermediate position of the alert region, even where the alert region is a portion of the perimeter of the building having an downwardly inclined roof, the electric wiring job in the loft can easily be accomplished. Moreover, since an single infrared sensor is sufficient, an increase of the cost can be suppressed.

In a preferred embodiment of the present invention, the infrared detector also includes a casing for accommodating the infrared sensor, the optical elements and the mirrors. In this case, the infrared sensor is arranged at an apex portion opposite to a bottom of the casing which is adapted to be mounted on a support surface, the mirrors are arranged at a portion between the bottom of the casing and the infrared sensor, and the optical elements are arranged on respective sides of the casing.

With the above described passive-type infrared detector, since the infrared sensor is arranged vertically upwardly with respect to the path of travel of the infrared rays of light incident upon the mirrors through the respective optical elements, the infrared sensor, the optical elements and the mirrors can be compactly housed within the casing having a width smaller than the focal length of the optical elements and, hence, the detector can be assembled having a reduced outer size.

According to another aspect of the present invention, there is also provided an infrared detector which includes a casing, a pair of infrared sensors housed within the casing, and a pair of optical elements housed within the casing for defining detection areas opposed substantially 180° to each other for the associated infrared sensors.

With the passive-type infrared detector of the structure described above, when the infrared detector is installed at an intermediate position of the alert region, the use of a combination of one of the infrared sensors, and one of the optical elements is effective to monitor an area ranging from one end of the alert region to the intermediate position whereas the use of a combination of the other of the infrared sensors and the other of the optical elements is effective to monitor an area ranging from the opposite end of the alert region to the intermediate position. Accordingly, a distance of ½ of the alert region can be utilized as a detection distance. Consequently, for watching the same alert region, the optical elements can have a focal length that is ½ of that used in the prior art detector which is positioned at one extremity of the alert region and, hence, with the detector of a reduced outer size, a relatively long alert region can be monitored. Also, since the detector is installed at the intermediate position of the alert region, even where the alert region is a portion of a perimeter of the building having the downwardly inclined roof, the electric wiring job in the loft can easily be accomplished.

In a preferred embodiment of the present invention, the infrared sensors are arranged within the casing to allow respective center lines of the detection areas opposed substantially 180° to each other to displace parallel relative to each other.

With this passive-type infrared detector, the pair of the infrared sensors and the optical elements can be compactly housed within the casing having a width generally equal to the focal length of the optical elements and, hence, the detector can be assembled having a reduced outer size.

Preferably, each of the optical elements is a narrow-type for defining an detection area encompassed by one or two fingers when viewed in plane.

Also preferably, the infrared sensor comprises a pair of elements having respective outputs of opposite polarities and wherein the detection areas encompassed by each finger are made up of a pair of divided areas corresponding to the pair of the element and arranged horizontally. With this passive-type infrared detector, the detection sensitivity can be increased and, therefore, even though the number of the fingers is one or two, an accurate detection is possible.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

Figure 7A:
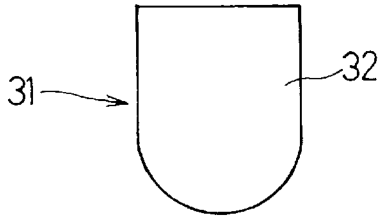
Fig.7A Prior Art
FIG. 7A is a top plan view of the second prior art infrared detector.
Figure 7C:
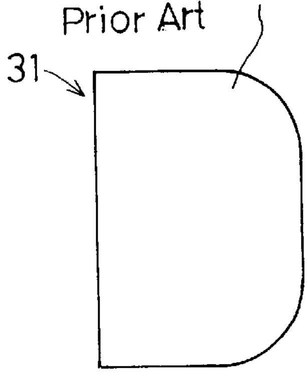
Fig.7C Prior Art
Figure 7B:
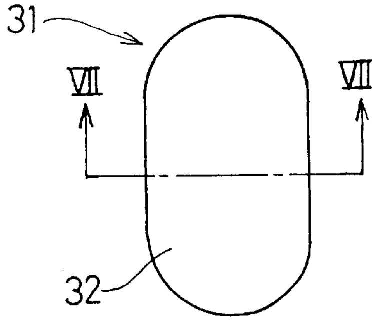
Fig.7B Prior Art
Figure 7D:
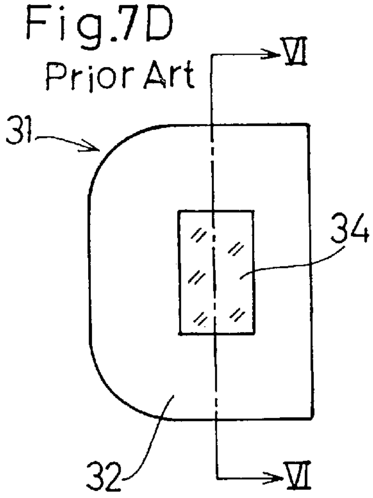
Fig.7D Prior Art
Figure 7E:
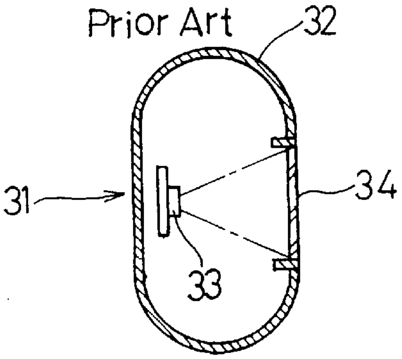
Fig.7E Prior Art
Figure 7F:
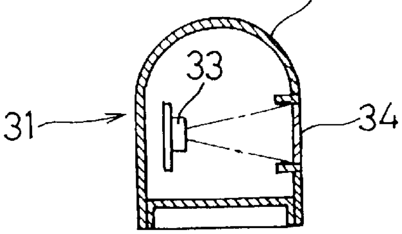
Fig.7F Prior Art
Figures 8A, 8B:
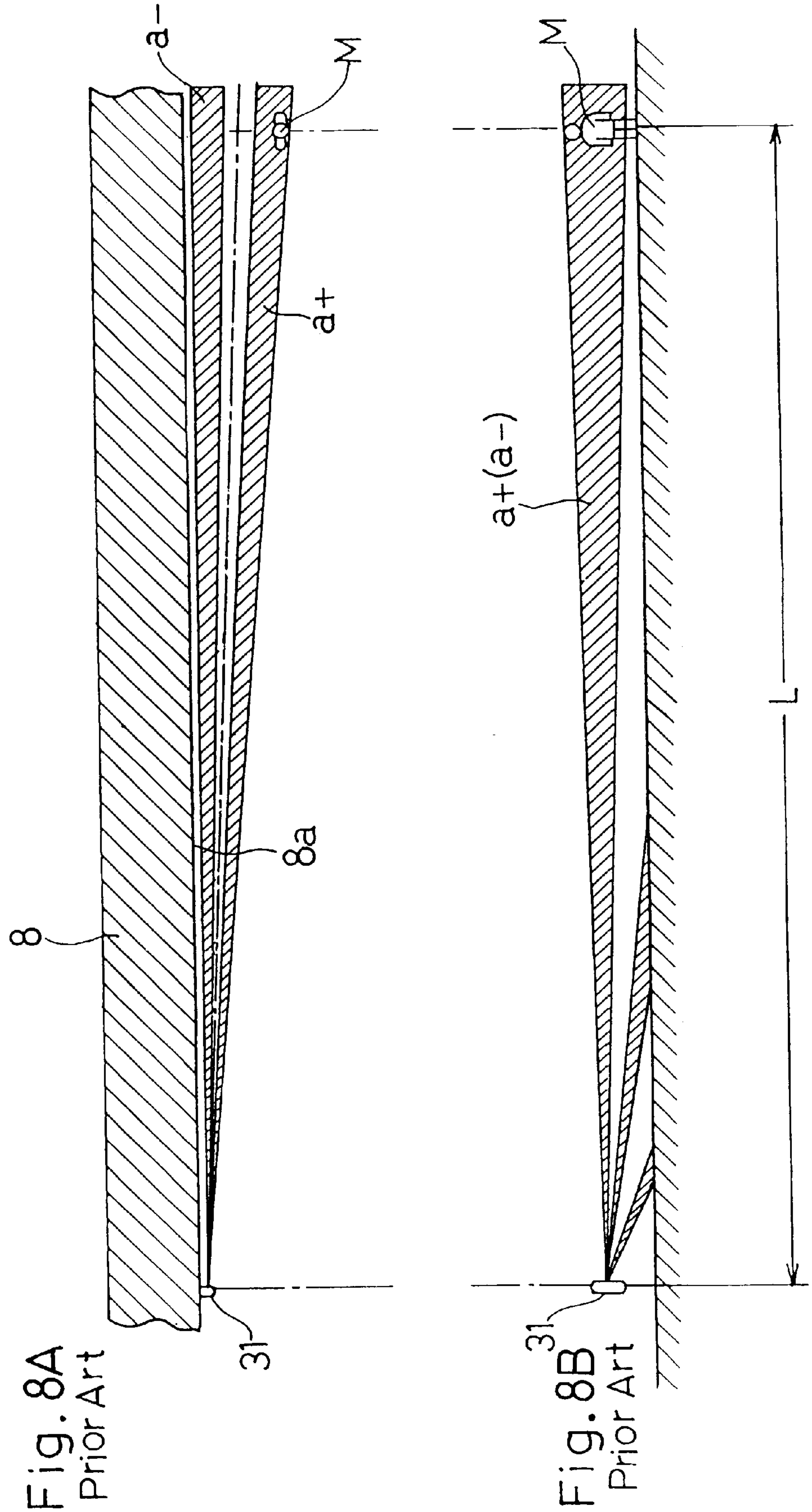
Fig. 8A Prior Art
Fig. 8B Prior Art

FIG; 7B is a front elevational view of the prior art infrared detector shown in FIG. 7A;

FIG. 7C is a left-hand side view of the prior art infrared detector shown in FIG. 7A;

FIG. 7D is a right-hand side view of the prior art infrared detector shown in FIG. 7A;

FIG. 7E is a cross-sectional view taken along the line VI—VI in FIG. 7D;

FIG. 7F is a cross-sectional view taken along the line VII—VII in FIG. 7B;

FIG. 8A is a top plan view showing the manner in which the prior art infrared detector shown in FIG. 7A is installed; and FIG. 8B is a front elevational view showing the manner in which the prior art infrared detector shown in FIG. 7A is installed.

DETAILED DESCRIPTION OF THE EMBODIMENTS

Figure 1A:
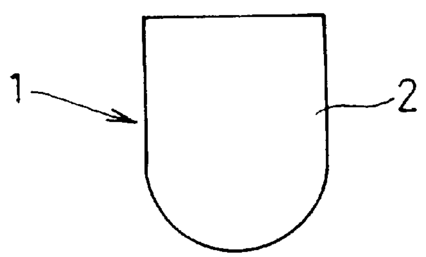
FIG. 1A is a top plan view of a passive-type infrared detector according to a first preferred embodiment of the present invention.
Figure 1C:
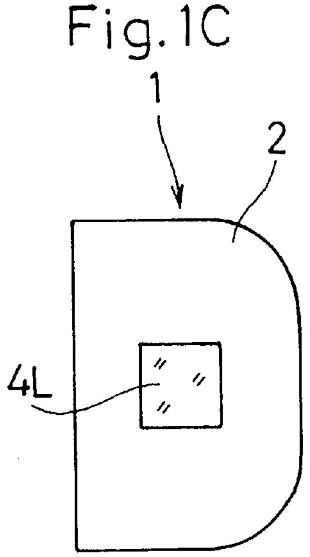
FIG. 1C is a left-hand side view of the passive-type infrared detector shown in FIG. 1A.
Figure 1B:
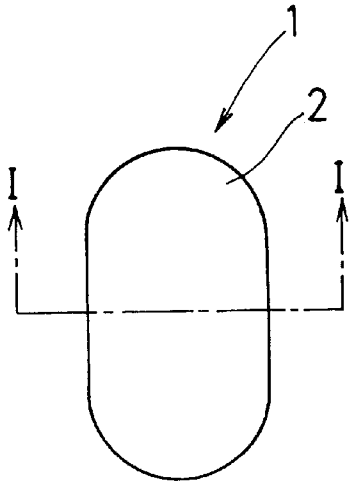
FIG. 1B is a front elevational view of the passive-type infrared detector shown in FIG. 1A.
Figure 1D:
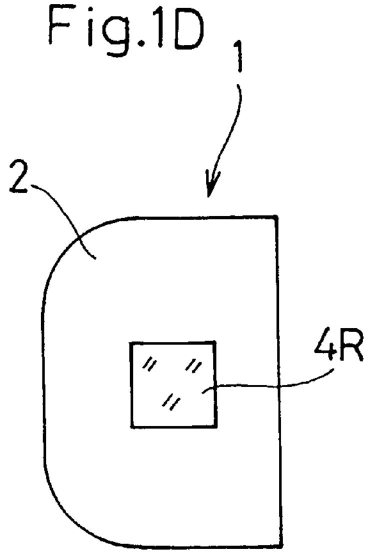
FIG. 1D is a right-hand side view of the passive-type infrared detector shown in FIG. 1A.
Figure 1E:
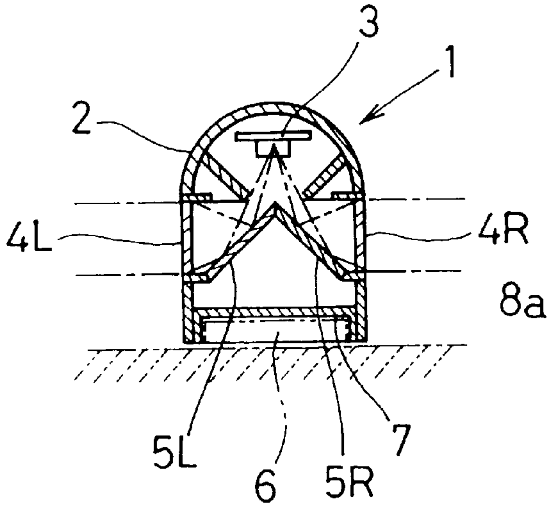
FIG. 1E is a cross-sectional view taken along the line I—I in FIG. 1B

FIGS. 1A to 1E show a passive-type infrared detector 1 according to a first preferred embodiment of the present invention. As shown in FIG. 1E, the illustrated passive-type infrared detector 1 comprises a casing 2, a single infrared sensor 3 accommodated within the casing 2, first and second lens elements 4R and 4L facing in respective directions opposite to each other, when viewed from top, so as to define right and left detection areas about 180° opposite to each other, first and second mirrors 5R and 5L for guiding respective infrared rays of light from the right and left detection areas towards the single infrared sensor 3. The casing 2 has a bottom formed with an engagement recess 7 extending inwardly thereof for receiving therein a fixture base member 6 that is fixed directly to a mounting surface 8*a* such as, for example, a wall or the like. By engaging the fixture base member 6 in the engagement recess 7 and subsequently fastening a portion of the casing 2 to the fixture base member 6 by means of one or more screws, the infrared detector 1 can be fixed the infrared detector 1 to the mounting surface 8*a* such as the wall through the fixture base member 6.

The casing 2 has opposite side walls on which the first and second lens elements 4R and 4L are formed, and a top wall, opposite to the bottom, adjacent an apex portion of which the infrared sensor 3 having a light receiving window is positioned with the light receiving window facing downwards. The first mirror 5R for reflecting an infrared beam, collected by the first lens element 4R, so as to travel towards the infrared sensor 3 and the second mirror 5L for reflecting an infrared beam, collected by the second lens element 4L, so as to travel towards the infrared sensor 3 are positioned between the infrared sensor 3 and the bottom of the casing 2.

Figure 2A:
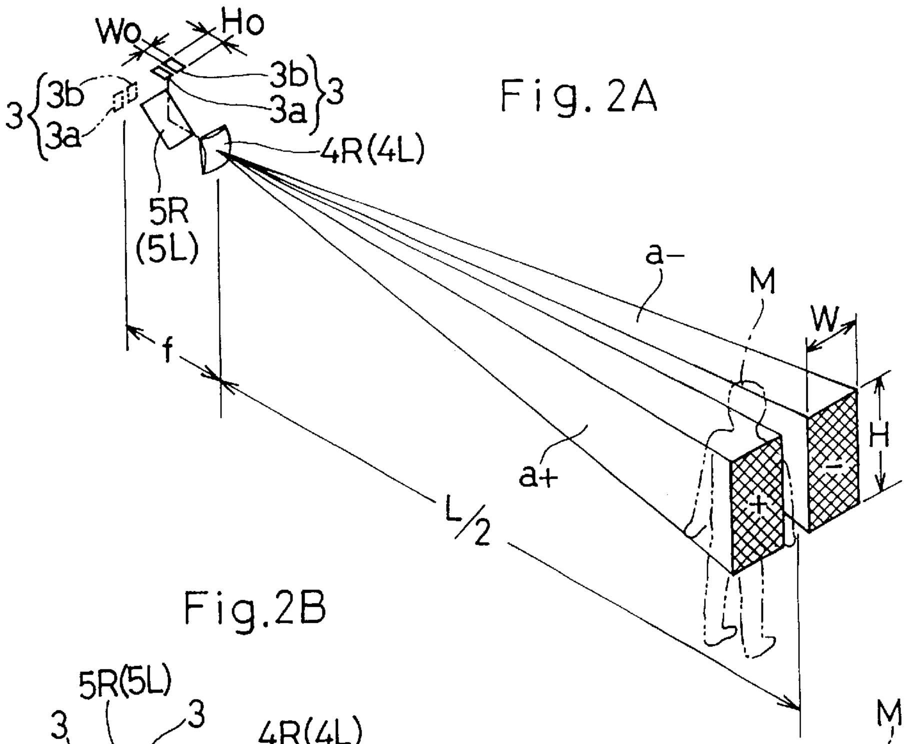
FIG. 2A is a schematic perspective view showing the structure of a portion of the optical system employed in the passive-type infrared detector shown in FIG. 1A.
Figure 2B:
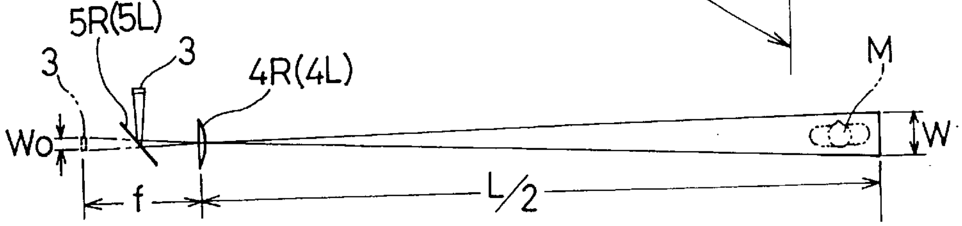
FIG. 2B is a top plan view of the optical system shown in FIG. 2A.
Figure 2C:
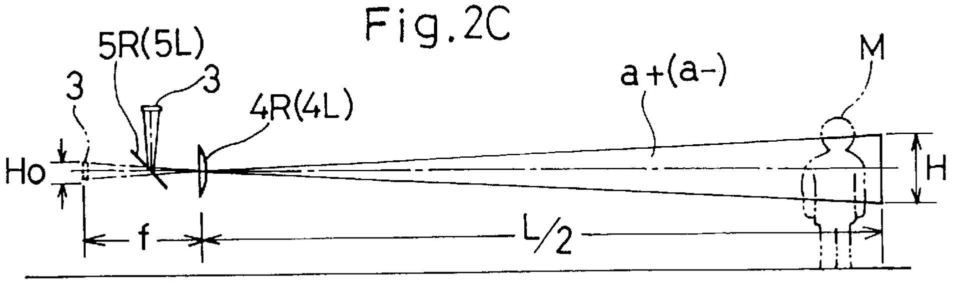
FIG. 2C is a front elevational view of the optical system shown in FIG. 2A.

As shown in FIGS. 2A to 2C, the infrared sensor 3 comprises a pair of rectangular infrared sensing elements 3*a* and 3*b* corresponding respectively to horizontally juxtaposed divided areas a+ and a− through the associated lens elements 4R and 4L. A virtual image of the infrared sensor 3 viewed through the first mirror 5R is shown by the double-dotted chain line. The rectangular infrared sensing elements 3*a* and 3*b* are so designed as to provide respective outputs of opposite polarities when sensing the infrared rays of light.

Figure 2D:
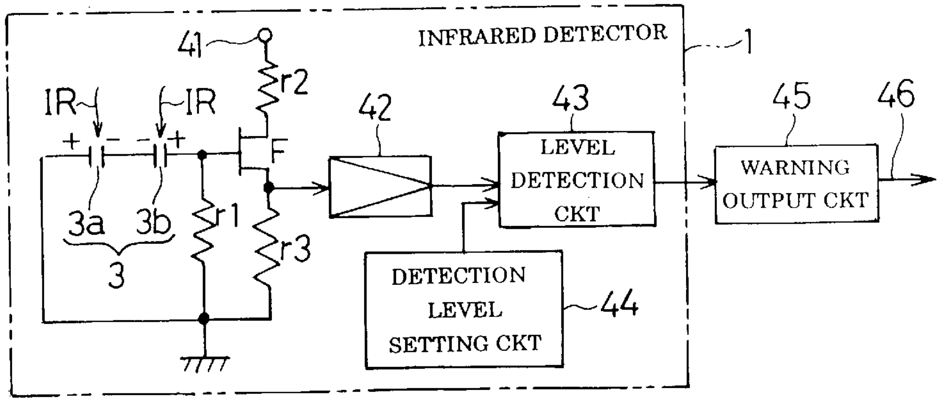
FIG. 2D is a circuit diagram showing a circuit of an alarm system using the detector shown in FIG. 2A.

In other words, as shown in FIG. 2D showing an electric warning circuit utilizing the infrared detector 1 of the structure described above, the paired rectangular infrared sensing elements 3*a* and 3*b* are connected in series with each other in a sense opposite in polarity to each other and, therefore, respective electric charges developed by bundles IR of infrared rays of light originating from an object M (See FIG. 2A) to be detected and subsequently incident on the paired infrared sensing elements 3*a* and 3*b* are discharged through an input resistor r1 of a high resistance and, at the same time, impedance-converted by a field-effect transistor F, and finally extracted as a signal which has been amplified through two amplifying resistors r2 and r3 connected in series with a direct current power source 41 through the field-effect transistor F under the source-follower connection. Thus, the output signal of an increased level corresponding to the sum of the electric charges of opposite polarities developed in the infrared sensing elements 3*a* and 3*b* is, after having been amplified by an amplifying circuit 42, supplied to a level detecting circuit 43 comprised of a comparator circuit.

The level detecting circuit 43 compares the signal intensity of the input signal, that is, a signal level corresponding to amounts of change of the bundled infrared rays IR incident upon the infrared sensing elements 3*a* and 3*b*, from time to time with a predetermined detection level set in a detection level setting circuit 44 and outputs a human body detection signal to a warning output circuit 45 when the input signal level exceeds the predetermined detection level. The warning output circuit 45 outputs a warning output 46 which may be utilized to activate an alarm (not shown) and/or to signal a security center (not shown).

As described above, the use has been made of the infrared sensing elements 3*a* and 3*b* capable of providing the respective outputs of the opposite polarities. Therefore, the passive-type infrared detector 1 shown in FIG. 2A can exhibit an increased detecting sensitivity with respect to the object M to be detected that successively traverses the detection areas a+ and a− corresponding respectively to areas of the rectangular infrared sensing elements 3*a* and 3*b* projected by associated optical systems. The infrared sensor 3 generally has such a characteristic that the highest sensitivity can be exhibited when the object M to be detected having a width generally equal to the width W of each of the detection areas a+ and a− of the rectangular infrared sensing elements 3*a* and 3*b* projected by the associated optical systems successively traverses the detection areas a+ and a− each at a speed comparable to a frequency of 1Hz. In view of this, it is possible to minimize the occurrence of any possible erroneous detection which would otherwise occur with respect to the change in temperature which is low in frequency at the surface of the passive-type infrared detector resulting from, for example, the wind. Also, in the passive-type infrared detector, detection of infrared rays of light resulting from an external disturbance incident substantially simultaneously upon the divided detection areas a+ and a−, such as detection of external light which would constitute a cause of the erroneous detection, can be counterbalanced by the rectangular infrared sensing elements 3*a* and 3*b*.

Figure 3A:
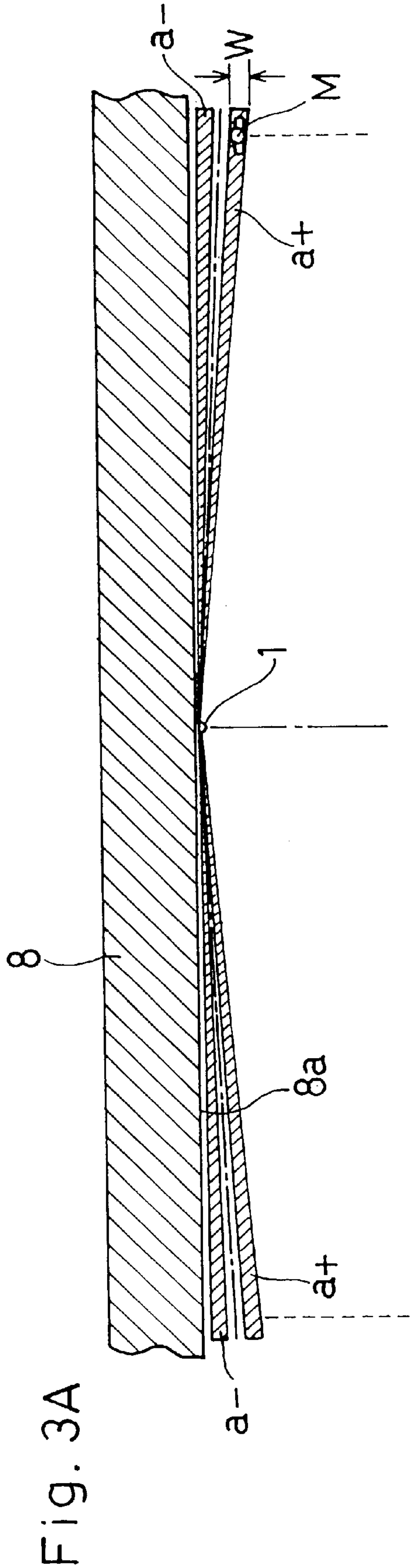
FIGS. 3A is a top plan view showing the manner in which the passive-type infrared detector is installed.
Figure 3B:
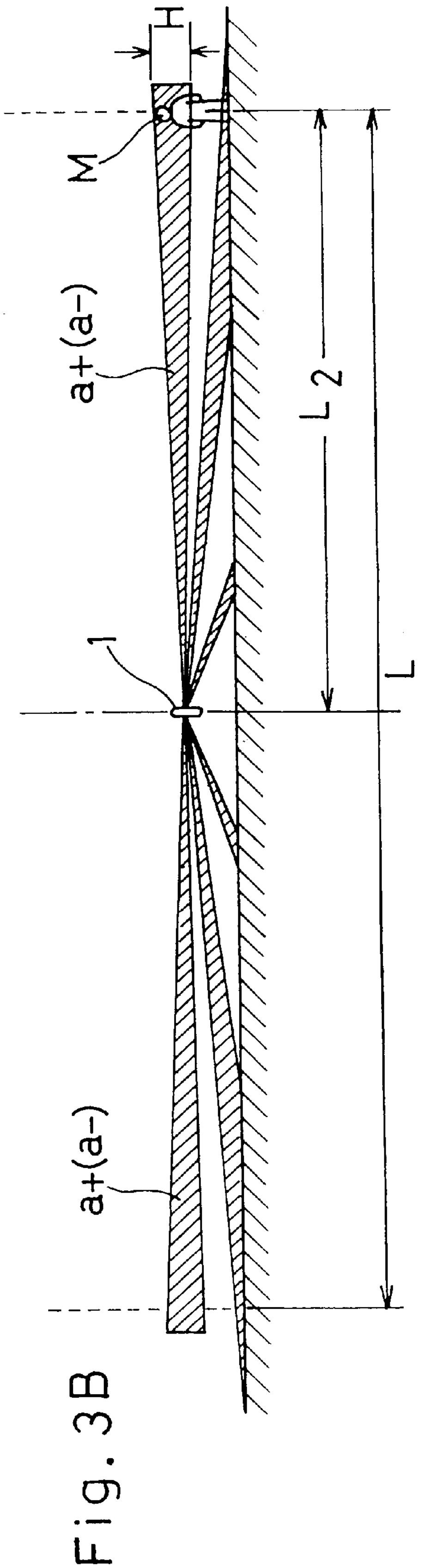
FIG. 3B is a front elevational view showing the manner in which the passive-type infrared detector is installed.

FIGS. 3A and 3B is top plan and front elevational views showing the manner in which the passive-type infrared detector 1 fixed to a surface 8*a* of an outer wall 8 of a building is used to monitor an elongated alert region extending along the perimeter of the building. In this example, the infrared detector 1 is installed at a position generally intermediate of the length L of the alert region with one of detection areas oriented towards one of the alert region and with the other of the detection areas oriented towards the other of the alert region. These detection areas referred to above are divided, as shown in FIG. 3B, in three stages one above the other, each of such three stages having the horizontally juxtaposed divided detection areas a+ and a−. In other words, the lens elements 4R and 4L of the infrared detector 1 are a narrow type and define respective single fingers, each comprised of the paired divided detection areas a+ and a−, on respective sides 180° opposite to each other. The term "narrow type" herein used is intended to encompass definition of two horizontally juxtaposed fingers on each side of the infrared detector, when viewed from top, so that the infrared detector can have four fingers in total two on each side.

The number of the vertical stages appearing when viewed from front may be one, two, four or more, all encompassed within the narrow type. Each of the lens elements 4R and 4L may be employed for each stage, or for each of the divided detection areas a+ and a− and may be of a structure in which divided lens are arranged.

In this installation, the following relations established, assuming:

L: Rated distance descriptive of the length of the alert region,

W: Width of each of the detection areas a+ and a− measured at a position of the largest distance L/2 from the site of installation of the infrared detector capable of detecting the object M to be detected, H: Height of each of the detection areas a+ and a− measured at a position of the largest distance L/2 from the site of installation of the infrared detector capable of detecting the object M to be detected, Po: Amount per unitary area of infrared radiation energies from the object M to be detected, Wo: Width of each of the rectangular infrared sensing elements 3*a* and 3*b* of the infrared sensing element 3, Ho: Height of each of the rectangular infrared sensing elements 3*a* and 3*b* of the infrared sensing element 3, P: Amount of infrared energies required for the infrared sensing element 3 to accomplish detection, S: Surface area of each of the lens elements 4R and 4L, and f: Focal length of each of the lens elements 4R and 4L.

In the first place, as shown in FIG. 2B, since what the infrared sensing element 3 has projected through the lens element 4R corresponds to each of the detection areas a+ and a−, $$Wo/f=W/(L/2) \qquad (1)$$

Hence, the focal length f is given by the following equation:

$$f=(L/2)\cdot(Wo/W) \qquad (2)$$

Assuming L=2,000 cm (20 m) and Wo=0.1 cm (1 mm) as a specific example and applying these specific values to the equation (2) above:

$$f=100/W(\text{cm}) \qquad (3)$$

Also, as apparent from FIG. 2C, the following equation establishes:

$$Ho/f=H/(L/2) \qquad (4)$$

Hence, the height H of the detection area at the end of the alert region is expressed by the following equation:

$$H=(L/2)\cdot(Ho/f) \qquad (5)$$

Assuming the height Ho of the infrared sensing element is 0.2 cm and applying this value, together with L=2,000 cm and f=100/W (cm), to the equation (5), the height H of the detection area is expressed by the following equation:

$$H=2W(\text{cm}) \qquad (6)$$

Also, since the amount P of the infrared energies required to detect the object M to be detected that is positioned at the end of the alert region is in proportion to the surface area (S) of the lens elements 4R and 4L and the amount of the infrared radiation energies from all surfaces of the detection areas a+ and a− and is in inverse proportion to the square of the distance (L/2), it can be expressed as follows:

$$P=S(Po\cdot W\cdot H)/(L/2)^2 \qquad (7)$$

Applying H=2W (cm) and L=2,000 cm to the equation (7) results in:

$$P=S(Po\cdot W\cdot 2W)/(2000/2)^2$$

Therefore, the surface area S of the lens elements 4R and 4L can be expressed by the following equation:

$$S=5\times10^5\times(p/po)/W^2(\text{cm}^2) \qquad (8)$$

In contrast thereto, if the prior art passive-type infrared detector 21 shown in FIG. 5 is installed at the end of the alert region in the same way as that shown in FIG. 6 to monitor the alert region, the focal length f, and the surface area S1 of the lens element 24 can be calculated as follows:

$$Wo/f_1/=W/L \quad (9)$$

Hence, the focal length $f_1$ can be given as follows:

$$f_1=L\times(Wo/W) \quad (10)$$

Assuming L=2,000 cm (20 m) and Wo=0.1 cm (1 mm) as a specific example and applying these specific values to the equation (10) above results in:

$$f_1=200/W(\text{cm}) \quad (11)$$

Figure 6A:
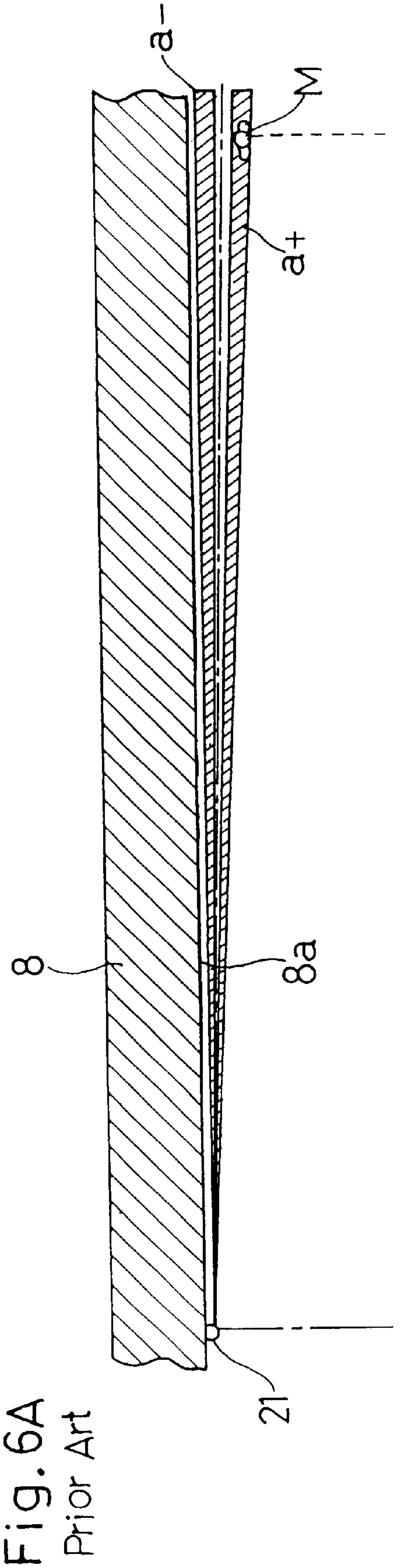
Fig. 6A Prior Art
FIG. 6A is a top plan view showing the manner in which the prior art infrared detector shown in FIG. 5A is installed.
Figure 6B:
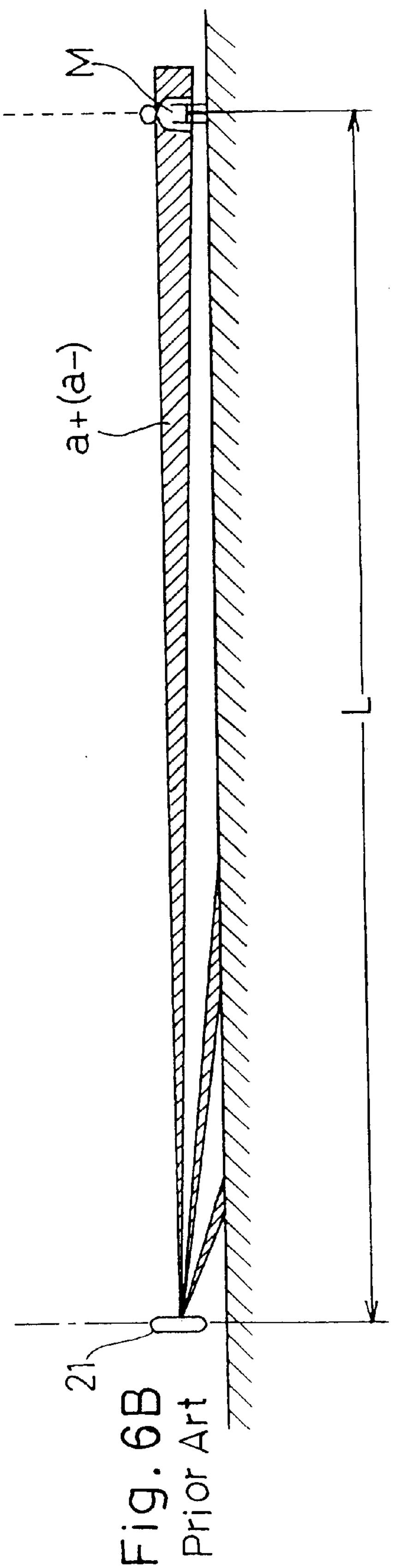
Fig. 6B Prior Art
FIG. 6B is a front elevational view showing the manner in which the prior art infrared detector shown in FIG. 5A is installed.

Comparing the equation (11) with the equation (3), it will readily be seen that the passive-type infrared detector 1 according to the embodiment of the present invention can have the lens elements 4R and 4L each having the focal length f which is one half of that employed in the first prior art passive-type infrared detector shown in FIGS. 5 and 6.

In other words, in the case of the passive-type infrared detector 1 according to the embodiment of the present invention now under discussion, the casing 2 can have a width reduced by a quantity corresponding to the reduction of the lens elements 4R and 4L and, hence, the infrared detector 1 can be assembled in a correspondingly reduced size. Accordingly, the position of installation of the infrared detector 1 will hardly be detected by any trespasser who is the object M to be detected, accompanied by increase in security. Moreover, since the single infrared sensor 3 is sufficient in the infrared detector 1, an increase of the cost can be minimized.

Also, in the case of the previously discussed first prior art infrared detector, the amount P of the infrared energies required to detect the object M at the end of the alert region will be expressed by the following equation:

$$P=S1(Po\cdot W\cdot H)/L^2 \quad (15)$$

Applying H=2W (cm) and L=2,000 cm to the equation (15) above results in:

$$P=S1(Po\cdot W\cdot 2W)/(2000)^2 \quad (16)$$

Thus, the surface area S1 of the lens element 24 can be expressed by the following equation:

$$S1=2\times10^6\times(p/po)W^2(\text{cm}^2) \quad (17)$$

Comparing this result with the equation (8) above which represents the surface area of the single lens element, it will readily be understood that in the case of the passive-type infrared detector 1 according to the embodiment of the present invention now under discussion, the surface area of the lens elements 4R and 4L can be reduced to ¼ of that in the first prior art infrared detector shown in FIGS. 5 and 6. It is to be noted that since in the embodiment of the present invention now under discussion the two lens elements 4R and 4L are employed, the surface area of the lens elements 4R and 4L is in essence reduced to ½ of that in the prior art infrared detector.

Thus, even though the lens surface area is taken into consideration, it is clear that the passive-type infrared detector 1 of the present invention can be assembled in a compact size.

Moreover, according to the embodiment of the present invention now under discussion, the design has been made in that the infrared sensor 3 is disposed adjacent the apex portion of the casing 2 so as to be oriented perpendicular to the optical axes of the lens elements 4R and 4L and the mirrors 5R and 5L are so positioned as to reflect the infrared rays of light, collected through the lens elements 4R and 4L, so as to travel towards the infrared sensor 3. Accordingly the casing 2 can have a width smaller than the focal length f of the lens elements 4R and 4L.

Also, if the second prior art passive-type infrared detector 31 shown in FIG. 7 is installed at the end of the alert region in the same way as that shown in FIG. 8 to monitor the alert region in the same manner as hereinbefore described, the focal length $f_2$ and the surface area S2 of the lens element 34 can be calculated as follows.

In the prior art described above, since a value optimum for the detection at the distance of ½ of the length L of the alert region is chosen for the focal length $f_2$ of the lens element 34, the focal length $f_2$ in this case remains the same as the focal length f in the illustrated embodiment. Accordingly, the width and the height of the detection area at the distance L/2 from the end of the alert region, where the detector 31 is installed, to the intermediate position are W and H. Assuming that the width and the height of the detection area at the opposite end of the alert region is expressed by $W_2$ and $H_2$, the following relationship establishes:

$$Wo/f_2/W_2/L \quad (18)$$

Hence, the width $W_2$ of the detection area at the opposite end of the alert region can be expressed by the following equation:

$$W_2=L\times Wo/f_2=L\times Wo/f_2 \quad (19)$$

Applying the equation (19) to the equation (3) ($f_2$=100/W (cm)) results in:

$$W_2=L\times Wo/(100/W)=(L\times Wo\times W)/100 \quad (20)$$

Applying the specific values L=2,000 cm and Wo=0.1 cm to the equation (20) above results in the width $W_2$ of the detection area expressed by the following equation:

$$W_2=2W(\text{cm}) \quad (21)$$

In other words, in the case of the second prior art, the width $W_2$ of the detection area is twice that with the passive-type infrared detector 1 of the embodiment of the present invention and, therefore, the infrared detector according to the second prior art fails to satisfy the requirement concerning the narrowness of the detection area that is essential for the narrow sensor.

Again, in the case of the second prior art, the amount P of the infrared energies required to detect the object at the end of the alert region will be expressed by the following equation:

$$P=S2(Po\cdot W\cdot H_2)/L^2 \quad (22)$$

wherein $W\cdot H_2$ represent the radiation surface area of the infrared energies within the detection area (Surface area= $W_2\cdot H$). In other words, although the width of the detection area is $W_2$, the surface area in which the infrared energies are actually radiated where the human being which is the object to be detected has a width equal to W will be $W\cdot H_2$ Applying $H=2W_2=4W$ (cm) and L=2,000 cm to the equation (22) above results in:

$$P=S2(Po\cdot W\cdot 4W)/(2000)^2 \quad (23)$$

Thus, the surface area S2 of the single lens element 34 can be expressed by the following equation:

$$S2=1\times10^{6}\times(P/Po)W^{2}(\mathrm{cm}^{2}) \qquad (24)$$

Consequently, comparing this result with the equation (8) above which represents the surface area of the single lens element, it will readily be understood that in the case of the passive-type infrared detector 1 according to the embodiment of the present invention now under discussion, the sum of the respective surface areas of the lens elements 4R and 4L equals to that in the case of the second prior art shown in FIGS. 7 and 8.

Figure 4A:
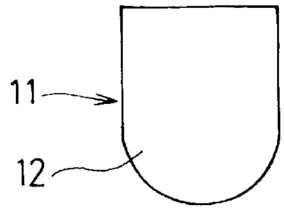
FIG. 4A is a top plan view of a passive-type infrared detector according to a second preferred embodiment of the present invention.
Figures 4B, 4C, 4D:
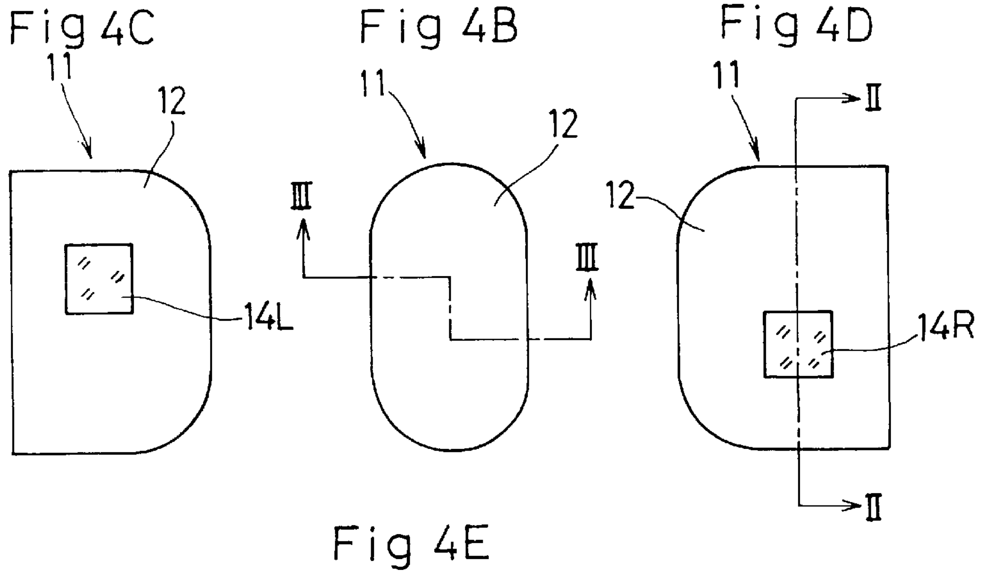
FIG. 4B is a front elevational view of the passive-type infrared detector shown in FIG. 4A.
FIG. 4C is a left-hand side view of the passive-type infrared detector shown in FIG. 4A.
FIG. 4D is a right-hand side view of the passive-type infrared detector shown in FIG. 4A.
Figure 4E:
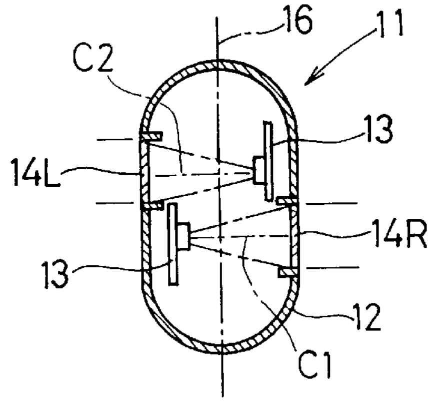
FIG. 4E is a cross-sectional view taken along the line II—II in FIG. 4D.
Figure 4F:
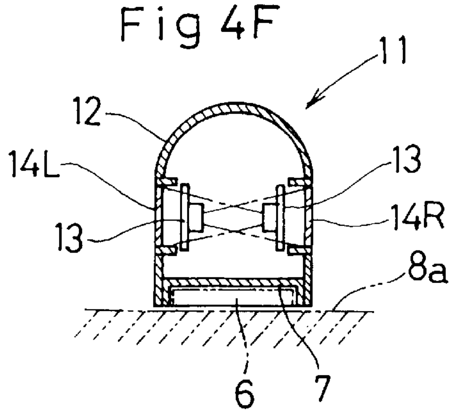
FIG. 4F is a cross-sectional view taken along the line III—III in FIG. 4B.
Figure 5A:
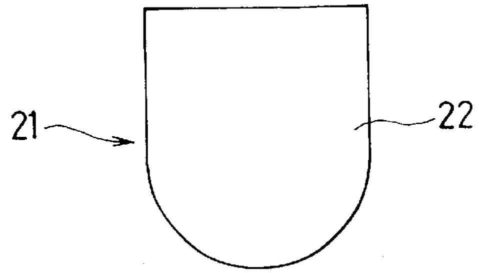
Fig. 5A Prior Art
FIG. 5A is a top plan view of the first prior art infrared detector.
Figure 5C:
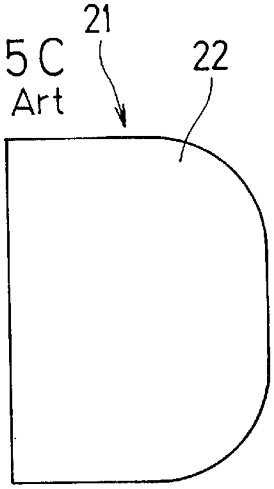
Fig.5C Prior Art
FIG. 5C is a left-hand side view of the prior art infrared detector shown in FIG. 5A.
Figure 5B:
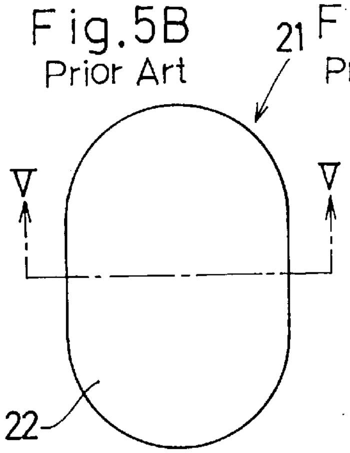
Fig.5B Prior Art
FIG. 5B is a front elevational view of the prior art infrared detector shown in FIG. 5A.
Figure 5D:
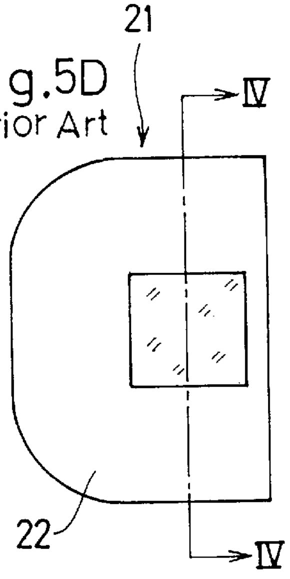
Fig.5D Prior Art
FIG. 5D is a right-hand side view of the prior art infrared detector shown in FIG. 5A.
Figure 5E:
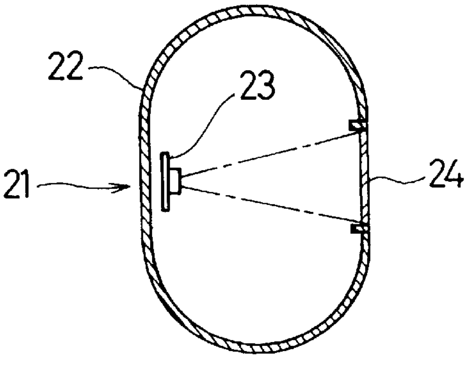
Fig.5E Prior Art
FIG. 5E is a cross-sectional view taken along the line IV—IV in FIG. 5D.
Figure 5F:
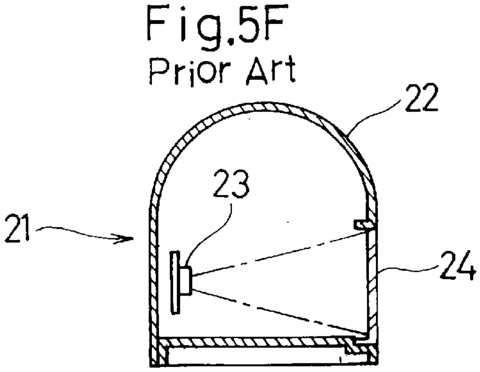
Fig.5F Prior Art
FIG. 5F is a cross-sectional view taken along the line V—V in FIG. 5B.

FIGS. 4A to 4F show a passive-type infrared detector according to a second preferred embodiment of the present invention. As shown in FIG. 4F, the illustrated passive-type infrared detector 11 comprises a casing 12, a pair of infrared sensors 13 accommodated within the casing 12, first and second narrow-type lens elements 14R and 14L facing in respective directions opposite to each other so as to define right and left detection areas about 180° opposite to each other for the associated infrared sensors 13 and 13. Within the casing 12, the infrared sensors 13 and 13 are, as shown in FIG. 4E, so arranged and so positioned that respective center lines C1 and C2 of the detection areas extend parallel to each other while displaced in a direction conforming to the longitudinal axis 16 of the casing 12.

As is the case with the foregoing embodiment, the casing 12 has a bottom formed with an engagement recess 17 extending inwardly thereof for receiving therein a fixture base member 16 that is fixed directly to a mounting surface 8*a* such as, for example, a wall or the like. The lens elements 14R and 14L are disposed on respective opposite sides of the casing 12 in axially offset relation with each other so that the lens elements 14R and 14L do not align with each other. The infrared sensors 13 and 13 are disposed at respective locations confronting the lens elements 14R and 14L.

Other structural features are substantially identical with those in the foregoing embodiments. Even in this case, where the use is made in monitoring a generally elongated alert region along the perimeter of, for example, the building, the passive-type infrared detector 11 is installed at an intermediate portion of the alert region with one of the detection areas facing towards one of the opposite ends of the alert region and the other of the detection areas facing towards the other of the opposite ends of the alert region. While the passive-type infrared detector 11 is installed in this way, the surface area S and the focal length f of the lens elements 14R and 14L can be determined as follows.

Namely, the focal length f of the lens elements 14R and 14L are as follows:

$$f=100/W(\mathrm{cm}) \qquad (25)$$

Accordingly, it will readily be seen that the focal length f of the lens elements 14R and 14L is one half of that in the prior art (i.e., focal length $f_1$ =200/W (cm)) shown in FIGS. 5 and 6 and, therefore, the casing 12 can have a width reduced correspondingly, allowing the infrared detector 11 to be assembled compact.

Although the surface area S of each of the lens elements 14R and 14L can be reduced to ¼ of that in the prior art (i.e., the lens surface area $S1=2\times10^{6}\times(P/Po)/W^{2}$ ($cm^2$)) shown in FIGS. 5 and 6, the surface area of the lens elements 4R and 4L is in essence reduced to ½ of that in the prior art infrared detector since in the embodiment of the present invention now under discussion the two lens elements 4R and 4L are employed. Thus, the infrared detector 11 can further be reduced in size.

Also, the detection area can have a width W which is ½ of that in the prior art (i.e., $W_2$=2W (cm)) shown in FIGS. 7 and 8 and, therefore, no detection area will be unnecessarily enlarged and factors which would constitute cause of erroneous warning can be reduced, allotting a relatively large freedom of selection at the site of installation.

Summarizing the foregoing, the following table can be obtained.

| | First Prior Art Ratio | Second Prior art | Invention |
|---|---|---|---|
| Focal Length | $f_1$: 2:1:2 | $f_2$: | f = |
| Area Width | W1: 1:2:1 | W2: | W = |
| Lens Surface Area | S1: 2:1:1 | S2: | S = |

Thus, according to the present invention, the passive-type infrared detector can be assembled compact in terms of the required focal length (that is, the size of the casing), the detection area width and the lens surface area.

Although the present invention has been fully described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A passive-type infrared detector which comprises:

an infrared sensor;

a pair of optical element for defining detection areas opposed substantially 180° to each other for the infrared sensor;

a pair of flat mirrors for directing infrared rays of light from the detection areas towards the infrared sensor.

2. The infrared detector as claimed in claim 1, further comprising a casing for accommodating the infrared sensor, the optical elements and the mirrors, and wherein the infrared sensor is arranged at an apex portion opposite to a bottom of the casing which is adapted to be mounted on a support surface, the flat mirrors are arranged at a portion between the bottom of the casing and the infrared sensor, and the optical elements are arranged on respective sides of the casing.

3. The infrared detector as claimed in claim 1, wherein each of the optical elements is a narrow-type for defining an detection area encompassed by one or two fingers when viewed in plane.

4. The infrared detector as claimed in claim 3, wherein the infrared sensor comprises a pair of elements having respective outputs of opposite polarities and wherein the detection areas encompassed by each finger are made up of a pair of divided areas corresponding to the pair of the element and arranged horizontally.

5. An infrared detector which comprises:

a single casing;

a pair of infrared sensors housed within the single casing; and a pair of optical elements housed within the single casing for defining detection areas opposed substantially 180° to each other for the associated infrared sensors.

6. The infrared detector as claimed in claim 5, wherein the infrared sensors are arranged within the casing to allow respective center lines of the detection areas opposed substantially 180° to each other to displace parallel relative to each other.

7. The infrared detector as claimed in claim 5, wherein each of the optical elements is a narrow-type for defining detection areas encompassed by one or two fingers when viewed in plane.

8. The infrared detector as claimed in claim 7, wherein each of the infrared sensors comprises a pair of elements having respective outputs of opposite polarities and wherein the detection areas encompassed by each finger are made up of a pair of divided areas corresponding to the pair of the element and arranged horizontally.

9. A passive infrared detector unit comprising:

a dome-shaped housing having a first side and a second side;

a first optical lens mounted on the first side;

a second optical lens mounted on the second side, an optical axis of each of the respective optical lenses are aligned on a common axis as they extend towards respective objective sides;

an infrared detector is mounted on an apex portion of the housing;

a first mirror mounted within the dome-shaped housing on the first side adjacent and below the first optical lens to direct the optical axis from the first optical lens to the infrared detector;

a second mirror mounted within the dome-shaped housing on the second side adjacent and below the second optical lens to direct the optical axis from the second optical lens to the infrared detector; and a recessed bottom member on the dome-shaped housing for engagement with a support surface, wherein the respective first and second mirrors incline upward towards the infrared detector.

10. A passive infrared detector unit comprising:

a dome-shaped housing having a first side and a second side;

a first optical lens mounted on the first side;

a second optical lens mounted on the second side, an optical axis of each of the respective optical lenses are aligned on a common axis as they extend 180° apart towards respective objective sides and provides elongated truncated detection areas;

an infrared detector having a pair of detector elements of opposite polarity connected in series is mounted on an apex portion of the housing for providing an output signal;

a first flat mirror within the dome-shaped housing directs the first optical axis from the first optical lens to the infrared detector; and a second flat mirror within the dome-shaped housing directs the second optical axis from the second optical lens to the infrared detector, the first flat mirror has one end mounted below the first optical lens on the first side and it's other end extending upward and inward to terminate below the infrared detector, the second flat mirror has one end mounted below the second optical lens on the second side and it's other end extending upward and inward to terminate below the infrared detector.

11. The passive infrared detector unit of claim 10 where the dome-shaped housing has a recessed bottom member for engagement with a fixture base member mounted on a support surface.

12. The passive infrared detector unit of claim 10 wherein the ends of the first and second flat mirrors are connected below the infrared detector.

* * * * *